(12) United States Patent
Alshaalan (10) Patent No.: US 12,297,930 B2
(45) Date of Patent: May 13, 2025

(54) DIGITIZED VALVE LOCKING DEVICE AND REMOTE MONITORING SYSTEM

(71) Applicant: SAUDI ARABIAN OIL COMPANY, Dhahran (SA)

(72) Inventor: Abdulaziz Alshaalan, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 15 days.

(21) Appl. No.: 18/454,568

(22) Filed: Aug. 23, 2023

(65) Prior Publication Data

US 2025/0067362 A1   Feb. 27, 2025

(51) Int. Cl.
*F16K 37/00* (2006.01)
*F16K 31/06* (2006.01)
*G06T 7/70* (2017.01)

(52) U.S. Cl.
CPC ...... *F16K 37/0041* (2013.01); *F16K 31/0655* (2013.01); *G06T 7/70* (2017.01); *G06T 2207/20081* (2013.01)

(58) Field of Classification Search
CPC .......................... F16K 37/0041; F16K 37/0058
See application file for complete search history.

(56) References Cited

U.S. PATENT DOCUMENTS

| | | | |
|---|---|---|---|
| 7,539,560 B2 * | 5/2009 | Boger | F16K 37/0075 700/282 |
| 8,899,264 B2 | 12/2014 | Young et al. | |
| 9,618,135 B1 * | 4/2017 | Kjar | F16K 35/00 |
| 9,619,712 B2 * | 4/2017 | Mullins | G08B 5/36 |
| 10,254,749 B2 * | 4/2019 | Main-Reade | G05B 19/4183 |
| 11,814,953 B2 * | 11/2023 | Duncan | F16K 37/0041 |

\* cited by examiner

*Primary Examiner* — Michael R Reid
(74) *Attorney, Agent, or Firm* — Osha Bergman Watanabe & Burton LLP (57) ABSTRACT

A system for monitoring a valve position includes a valve assembly, a locking device, an image sensor, a central signal receival unit, and a display board. The valve assembly controls fluid flow and includes a valve body, a valve, and a valve actuator. The locking device is disposed on the valve actuator to prevent the valve actuator from turning, and transmits a lock-status signal to the central signal receival unit indicating the locking device is locked. The image sensor captures an image of the valve actuator and transmits the image to the central signal receival unit. The central signal includes an image processing module that recognizes the valve actuator in the image and converts the position of the valve actuator into a valve-position signal, indicating whether the valve is open or closed. The display board receives the lock-status signal and the valve-position signal from the central signal receival unit and displays the signals for an operator to view.

20 Claims, 6 Drawing Sheets

DIGITIZED VALVE LOCKING DEVICE AND REMOTE MONITORING SYSTEM

BACKGROUND

Valves are commonly used in commercial and industrial systems, playing a pivotal role in facilitating the efficient transportation of liquids and gases (collectively referred to herein as "fluids") for various applications, such as water treatment, oil production and processing, and other activities involving pipelines. These systems often rely on extensive networks of piping to convey fluids over considerable distances. Crucial to these operations are numerous valves strategically positioned throughout the pipeline networks, serving the essential function of permitting or restricting the flow of fluids at different junctures. These valves are instrumental in regulating the movement of the fluids, ensuring optimal functionality, and allowing precise control over the processes within the systems. Conventional valve designs often demand significant manual intervention, leading to increased manpower requirements, higher operational costs, and potential human errors.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system for monitoring a valve position includes a valve assembly, a locking device, an image sensor, a central signal receival unit, and a display board. The valve assembly controls fluid flow and includes a valve body, a valve, and a valve actuator. The locking device is disposed on the valve actuator to prevent the valve actuator from turning, and transmits a lock-status signal to the central signal receival unit indicating the locking device is locked. The image sensor captures an image of the valve actuator and transmits the image to the central signal receival unit. The central signal includes an image processing module that recognizes the valve actuator in the image and converts the position of the valve actuator into a valve-position signal, indicating whether the valve is open or closed. The display board receives the lock-status signal and the valve-position signal from the central signal receival unit and displays the signals for an operator to view.

A method to monitor a valve position includes determining a lock-status signal of a locking device and a valve-position signal of a valve actuator. The method further includes transporting one or more fluids through a valve body and actuating a valve between an open and a closed position. In addition, the method includes rotationally fixing a location of the valve with a locking device, and transmitting a lock-status signal from the locking device to indicate whether the locking device is locked or unlocked. Furthermore, the method includes capturing an image of a valve actuator with an image sensor, then receiving the image and the lock-status signal on a central signal receival unit. Finally, the method includes determining the position of the valve actuator and outputting a valve-position signal, then displaying the lock-status signal and the valve-position on a display board for an operator to view.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the present invention are directed towards a valve and valve car seal monitoring system with a primary emphasis on automation and reduced human involvement. The system includes a valve assembly, a locking device, an image sensor, a central signal receival unit, and a display board. By integrating image processing technology and digitized locking mechanisms, the proposed design advantageously streamlines valve operations, minimizes the need for manual adjustments, and enhances overall efficiency.

Figure 1:
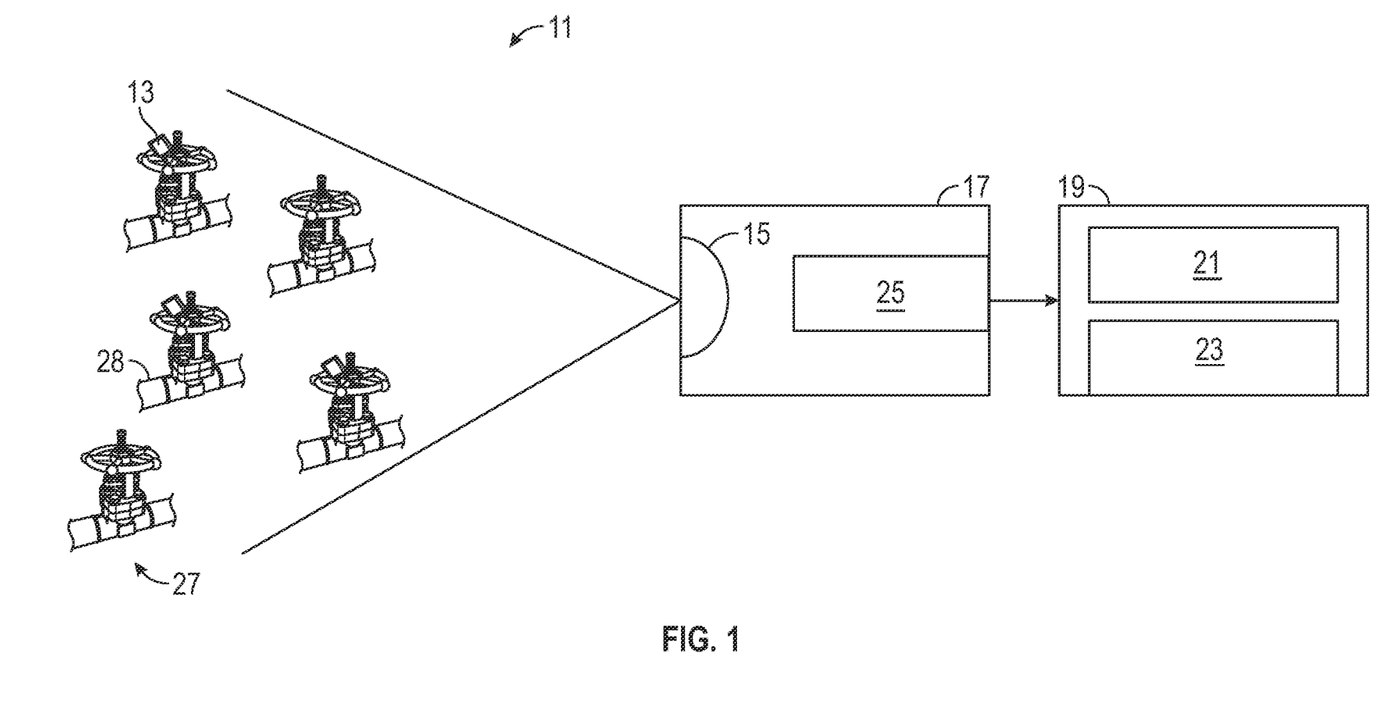
FIG. 1 depicts an operating plant site in accordance with one or more embodiments of the invention.

FIG. 1 shows a schematic diagram illustrating an example of an operating plant site 11 in accordance with one or more embodiments of the invention. In general, operating plant sites 11 are configured in a myriad of ways. Therefore, the operating plant site 11 is not intended to limit the particular configuration of the valve monitoring system. For example, the operating plant site 11 is depicted as only having one image sensor 17 capture all of the valve assemblies 27 in the image sensor's 17 field of view and relay the information directly to a central signal receival unit 19, however, the operating plant site 11 can have multiple image sensors 17, and there may be multiple operating plant sites 11 in different locations relaying information to multiple intermediary signal receival units that all connect to the central signal receival unit 19.

Figure 3A:
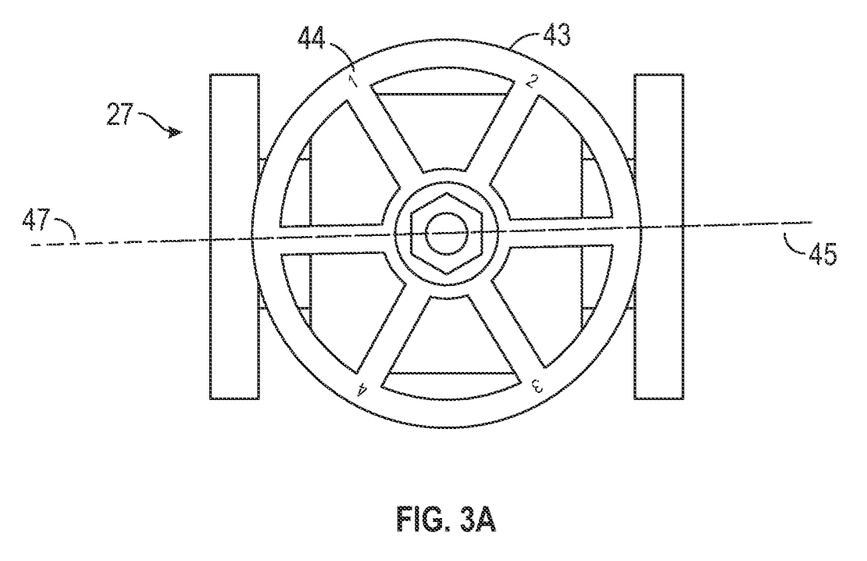
FIGS. 3A-3B depict various positions of the valve actuator in accordance with one or more embodiments of the invention.
Figure 3B:
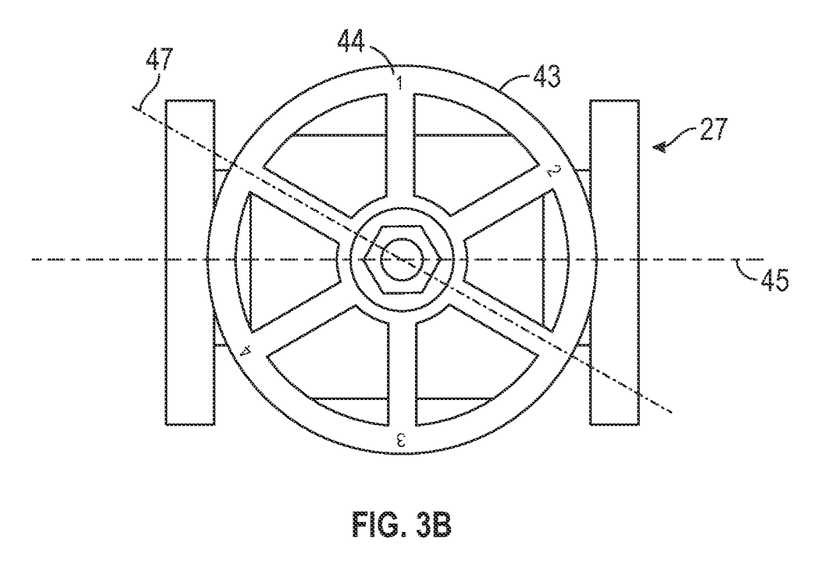

The valve assembly 27 comprises a valve body 28, a valve (not shown), and a valve actuator (e.g., FIG. 3A-3B). The valve body 28 has an inlet port and an outlet port that a fluid path extends between, providing a path for fluid to flow. The valve (not shown) is situated within the valve body 28 in the fluid path, configured to actuate from a closed position to an open position. The closed position closes the fluid path and the open position allows the fluid to flow freely. The valve (not shown) is actuated with a valve actuator (e.g., FIG. 3A-3B), disposed on the exterior of the valve body 28, and is rotated relative to an axis to close and open the fluid path.

The remote monitoring system at the operating plant site 11 is initiated by an image sensor 17 capturing an image of a valve assembly 27 within its field of view through a lens 15, and transmitting the image through a second transceiver 25 to a central signal receival unit 19. Additionally, a locking device 13 secured to the valve assembly 27 emits a lock-status signal to the central signal receival unit 19 through a first transceiver (e.g., FIG. 2). The central signal receival unit 19 comprises an image processing module and a communication port 23. The image processing module, comprising an Artificial Intelligence (AI) model further discussed below, after receiving the image of the valve assembly 27 from the image sensor 17, recognizes the position of a valve actuator (e.g., FIG. 3A-3B) in the valve assembly 27 and outputs a valve-position signal.

For example, the image processing module determines the valve-position signal as a percentage of how closed the valve is (e.g., 0% closed to 100% closed, where 0% closed indicates the valve is in the open position, and 100% closed indicates the valve is in the closed position). Alternatively, the image processing module may only determine whether the valve is in the open position or the closed position without any in between positions, which requires less processing power due to only needing the AI model to recognize two known positions of the valve actuator (e.g., FIG. 3A-3B) rather than computing unknown intermediary positions. The valve-position signal is transmitted through the communication port 23 to a display board (e.g., FIG. 4) configured to present the valve-position signal and the lock-status signal to an operator.

Further shown in FIG. 1, some valve assemblies 27 have the locking device 13 attached and some valve assemblies 27 do not have the locking device 13 attached. The current embodiment provides an example of how the image processing module is capable of determining the position of the valve actuator (e.g., FIG. 3A-3B) with and without a locking device 13 attached. Additionally, depending on the circumstances of the operating plant site 11, some valve assemblies 27 may not require a locking device 13.

Figure 2:
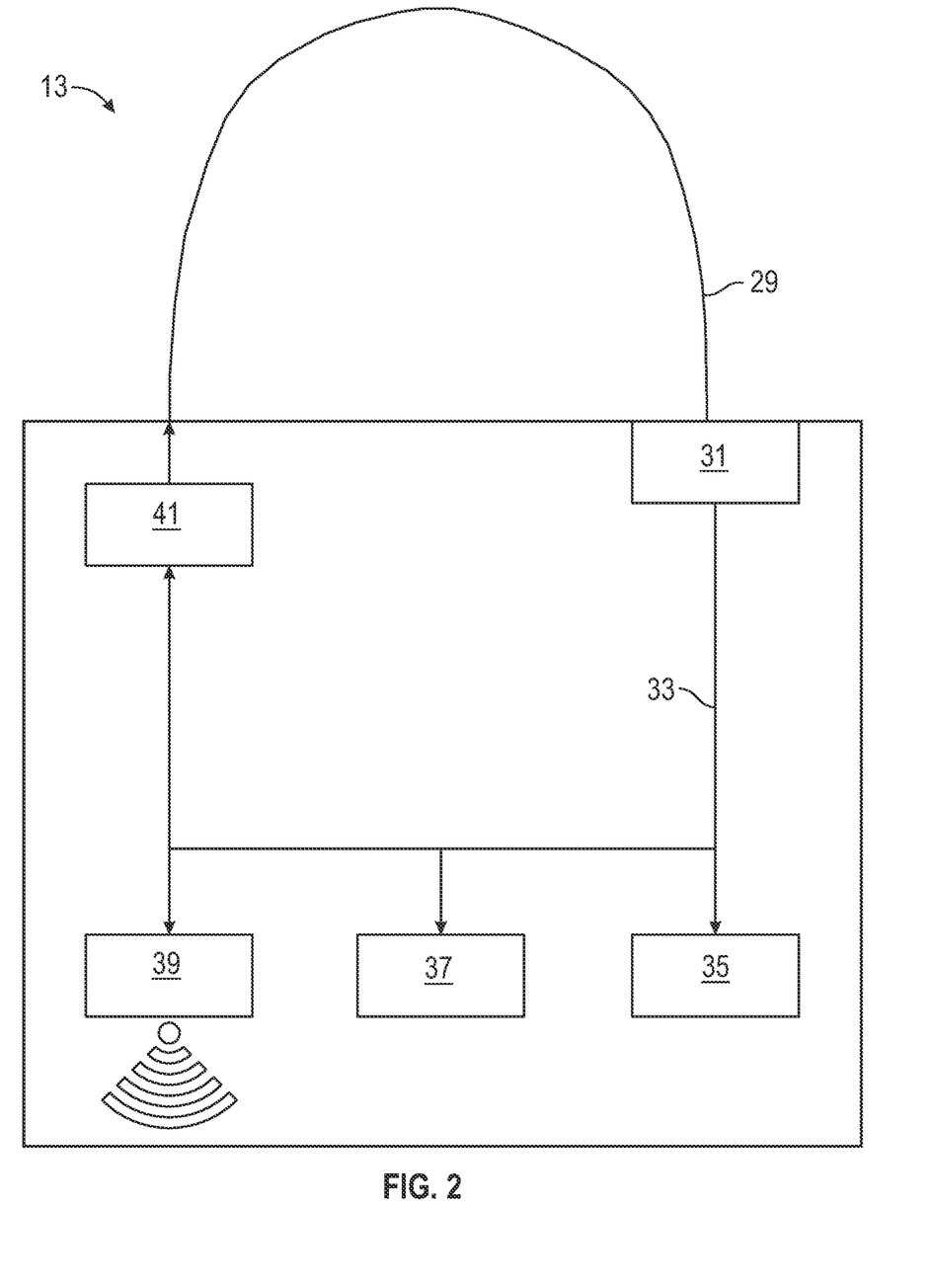
FIG. 2 depicts a locking device in accordance with one or more embodiments of the invention.

FIG. 2 depicts details of the locking device 13 that is secured around the valve assembly 27, preventing the valve actuator (e.g., FIG. 3A-3B) from moving from its current position in accordance with one or more embodiments of the invention without manual operator interference. The locking device 13 comprises a cable 29, a reception port 31, a bus 33, a processor 35, a memory 37, a first transceiver 39, and a battery.

The cable 29 is the component that prevents the valve actuator (e.g., FIG. 3A-3B) from turning. Additionally, the cable 29 receives an electrical signal from the battery, which is then transmitted to the processor 35 via the bus 33 after the cable 29 is inserted into the reception port 31, and the electrical signal is converted into the lock-status signal by the processor 35. In cases in which the cable 29 is cut, or is not inserted into the reception port 31, and the electrical signal is not received by the processor 35, the processor 35 determines that the locking device 13 is unlocked. The lock-status signal is stored in the memory 37, which is a non-transient storage medium, and the lock-status signal is then transmitted via the transmitter to the central signal receival unit 19. In one or more embodiments, the cable 29 is formed of galvanized steel. The locking-device may be presented in a plurality of color options, which may correspond to particular types of fluids being transmitted through the fluid path of the valve assembly 27 that the locking device 13 is securing.

In one or more embodiments, the lock-status signal has two outputs: "locked" and "unlocked." The locking device 13 is locked when the electrical signal from the battery is transmitted through the cable 29 to the processor 35. The locking device 13 is unlocked when the processor 35 does not receive an electrical signal from the cable 29, which may occur in instances such as when the cable 29 is inserted into the reception port 31 but is cut between the battery and the reception port 31, and when the cable 29 is not inserted into the reception port 31. In the case that the battery dies and cannot provide power, the lock-status signal will not be transmitted to the central signal receival unit 19, and the central signal receival unit 19 is configured to output that the locking device 13 requires manual operator intervention. The locking device 13 is an IoT device, and the lock-status signal is transmitted through the first transceiver 39 in the form of radio waves, which have a frequency between 10 Kilohertz (kHz) and 100 Gigahertz (GHz) to the central signal receival unit 19.

Turning to FIG. 3A, FIG. 3A shows a diagram of the valve assembly 27 from a top view in accordance with one or more embodiments of the invention. The valve actuator 43 is shown to be disposed along a neutral axis 45 and a valve axis 47. The neutral axis 45 is a reference for the image processing module 21 to compare the valve axis 47 against. In the embodiment shown, the valve actuator 43 is in line with the neutral axis 45, which the image processing module 21 would identify as either the open position or the closed position, depending on the valve axis 47 in relation to the neutral axis 45. In addition, the valve actuator 43 may come in a variety of colors, for instance, to indicate the type of fluid that is flowing through the respective valve body 28. Also, the valve actuator 43 may contain distinct markers 44, such as alphanumeric symbols, to aid the image processing module 21 in determining the position of the valve (not shown).

Turning to FIG. 3B, FIG. 3B shows a diagram of the valve assembly 27 from a top view, but the valve actuator 43 has been rotated from FIG. 3A, in accordance with one or more embodiments of the invention. The valve axis 47 is not in alignment with the neutral axis 45, and the image processing module 21 could identify based on the difference between the two axes how much the valve (not shown) has been actuated and whether it is in the open position or the closed position. As discussed above, the valve actuator 43 may contain distinct markers 44 to facilitate the image processing module 21 in distinguishing between rotationally symmetrical positions.

Figure 4:
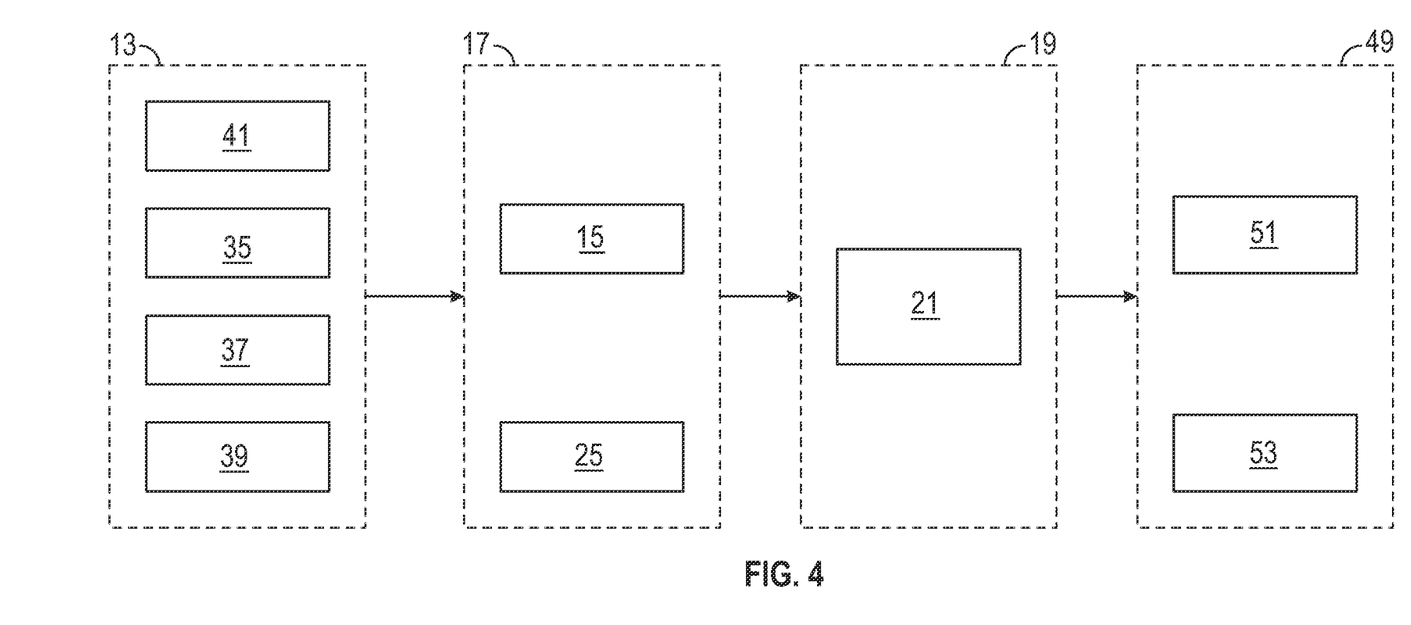
FIG. 4 depicts an operational sequence in accordance with one or more embodiments of the invention.

FIG. 4 depicts a diagram of a process for capturing outputs of the image sensor 17 and the locking device 13 according to one or more embodiments of the invention as described herein. The process begins with the locking device 13 comprising the battery, the processor 35, the memory 37, and the first transceiver 39. The locking device 13 is secured around the valve assembly 27 and transmits from the first transceiver 39 to the central signal receival unit 19 the lock-status signal 51, which indicates that the locking device 13 is either locked or unlocked.

Next in the process, the image sensor 17 comprising a lens 15 and a second transceiver 25, captures an image of the valve actuator 43 and transmits the image to the central signal receival unit 19. The image sensor 17 may capture multiple valve actuators 43 in the image, or more than one image sensor 17 may be used to capture all the valve actuators 43 in the operating plant site 11 if the field of view available to one image sensor 17 is unable to capture all of the valve actuators 43 present. The image sensor 17 should be positioned such that the valve actuator 43 can be recognized by the image processing module 21.

After the image is transmitted to the central signal receival unit 19, the central signal receival unit 19, comprising the image processing module 21, determines whether the valve (not shown) is in the open position or the closed position using the image. The image processing module 21 is formed as a series of code including an AI model, algorithms, instructions, and operations that may be written in various computer programming languages such as Python, C++, C#, R, Java, JavaScript, and equivalent languages known to a person of ordinary skill in the art. The image processing module 21 comprises an AI model that uses a You Only Look Once (YOLO) algorithm, for example, to identify the valve actuator 43, as well as the alphanumeric markers 44 on the valve actuator 43, in the image to determine the difference in the angle between the valve axis 47 relative to the neutral axis 45.

More specifically, the YOLO algorithm is a real-time object detection algorithm. The algorithm operates by dividing the image into a grid of equally shaped cells and generating bounding boxes encompassing potential objects. Each bounding box is assigned a confidence score and a class probability, representing the algorithm's certainty about the presence of an object and its corresponding class, respectively. The algorithm implements a single-pass approach, to efficiently and quickly predict object classes and their corresponding spatial positions simultaneously.

The YOLO algorithm achieves object detection by developing and refining a set of weights during a training phase. The weights are learned through a deep convolutional neural network, specifically designed to optimize the detection of various object classes. During training, the algorithm processes a dataset of annotated images and iteratively adjusts the weights to minimize the detection errors. The annotated images include valve actuators 43, locking devices 13, and the alphanumeric markers 44 located on the valve actuators 43. The training phase may occur in-house at the operating plant site when setting up the valve monitoring system, or a manufacturer can train the algorithm for a client.

The image processing module 21, and thus the YOLO algorithm, utilizes the trained weights to process the image from the image sensor 17 quickly and accurately. The algorithm effectively identifies objects' positions and their associated class. Furthermore, the utilization of pre-trained weights allows for efficient and accurate object detection, which is important for meeting proper safety protocol.

The central signal receival unit 19, using the image processing module 21, then outputs the position of the valve (not shown) in the form of the valve-position signal 53. The valve-position signal 53 indicates the position of the valve (not shown) as a percentage of how closed the valve (not shown) is (e.g., 0% closed to 100% closed, where 0% closed indicates the valve is in the open position, and 100% closed indicates the valve is in the closed position). At the operator's discretion, the valve-position signal 53 could conversely be interpreted as a percentage of how open the valve (not shown) is. Alternatively, the image processing module 21 can be configured to only output whether the valve (not shown) is in the open position or the closed position, which would be less computationally intensive for the reason of only having to verify two established positions of the valve actuator 43 rather than computing the angle between the valve axis 47 and the neutral axis 45.

Finally, the lock-status signal 51 and the valve-position signal 53 are transmitted to the display board 49 for an operator to interact with. The display board 49 is a user-interface for the operator to view the lock-status signal 51 and the valve-position signal 53 in real time.

Figure 5:
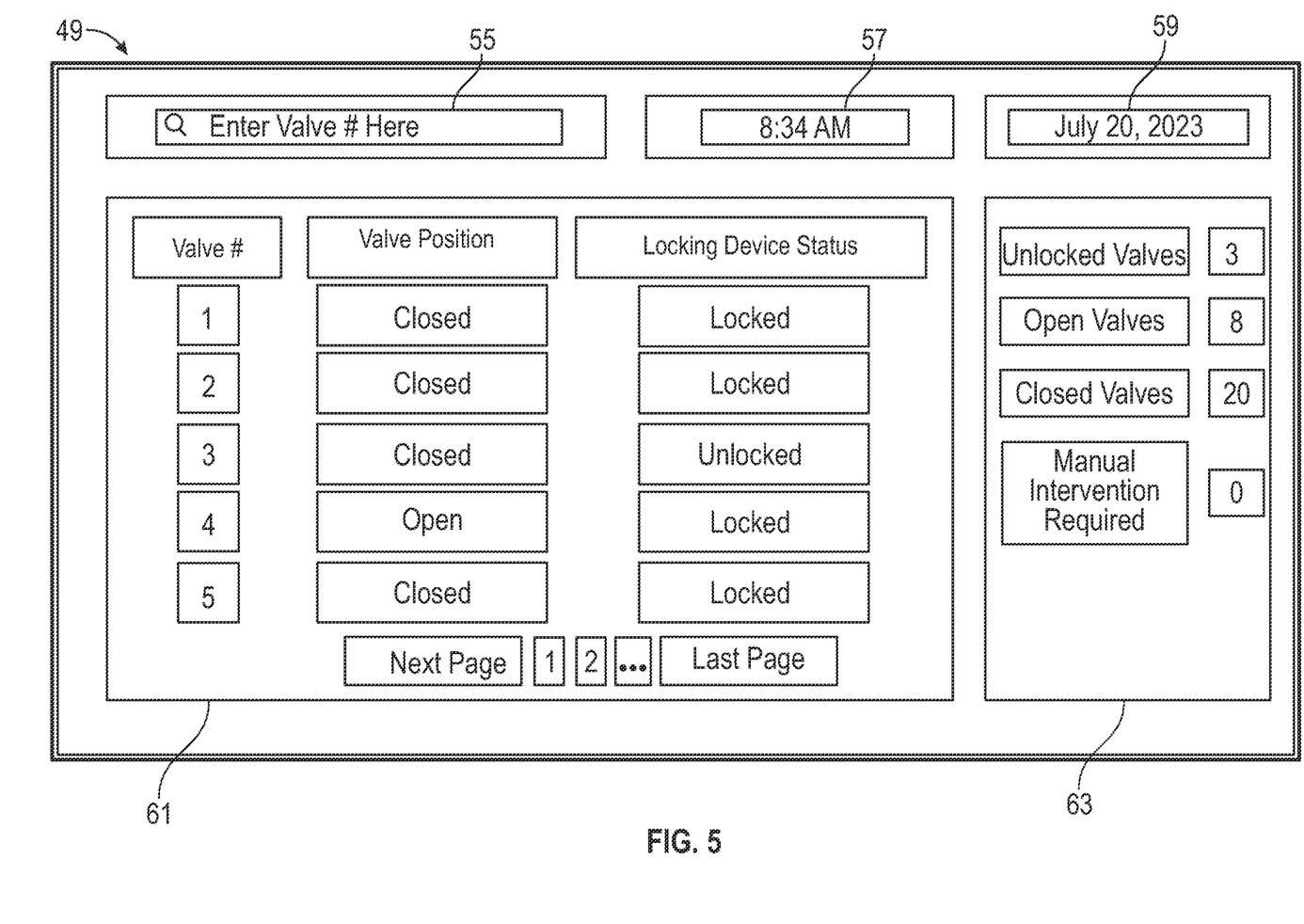
FIG. 5 depicts a user interface display in accordance with one or more embodiments of the invention.

FIG. 5 depicts the user interface shown on the display board 49 in accordance with one or more embodiments of the invention. The display board 49 contains a number of indicators that display real time data concerning the remote monitoring system. In particular, the display board 49 contains a search bar 55, an associated valve signal indicator 61, a summary signal indicator 63, a time 57, and a date 59. During operation, values reflected in the associated valve signal indicator 61 represent the valve-position signal 53 (an output of the YOLO algorithm within the image processing module 21) and the lock-status signal 51, as well as the valve (not shown) the signals are associated with. Additionally, the associated valve signal indicator 61 has multiple pages that can be accessed by choosing a next page option.

Furthermore, the user interface includes a summary signal indicator 63, which provides a quick summary of the lock-status signal 51 and the valve-position signal 53. The summary signal indicator 63 includes the total number of locking devices 13 that are unlocked, the total number of valves (not shown) in the open position, the total number of valves (not shown) that are in the closed position, and the total number of locking devices 13 that require manual operator intervention such as for the purpose of replacing batteries in the locking device 13. In addition, the operator may click on the boxes in the summary signal indicator 63 to see the valves (not shown) that are associated with the options provided.

The user interface provides a search bar 55 for the operator to quickly type in a specific number associated with the valve (not shown) for the purpose of checking a specific valve (not shown) quickly. After the operator enters the valve number in the search bar 55, the associated valve signal indicator 61 will update with the valve-position signal 53 and the lock-status signal 51 of the requested valve.

Finally, the user interface includes a current time 57 and a current date 59 at the top of the display board 49. The time 57 and date 59 provide easier accessibility for the operator when checking the valve-position signal 53 and the lock-status signal 51 for the purpose of reporting at what date 59 and time 57 an event occurred without having to reference an outside source and reduce inaccuracy in reports.

Figure 6:
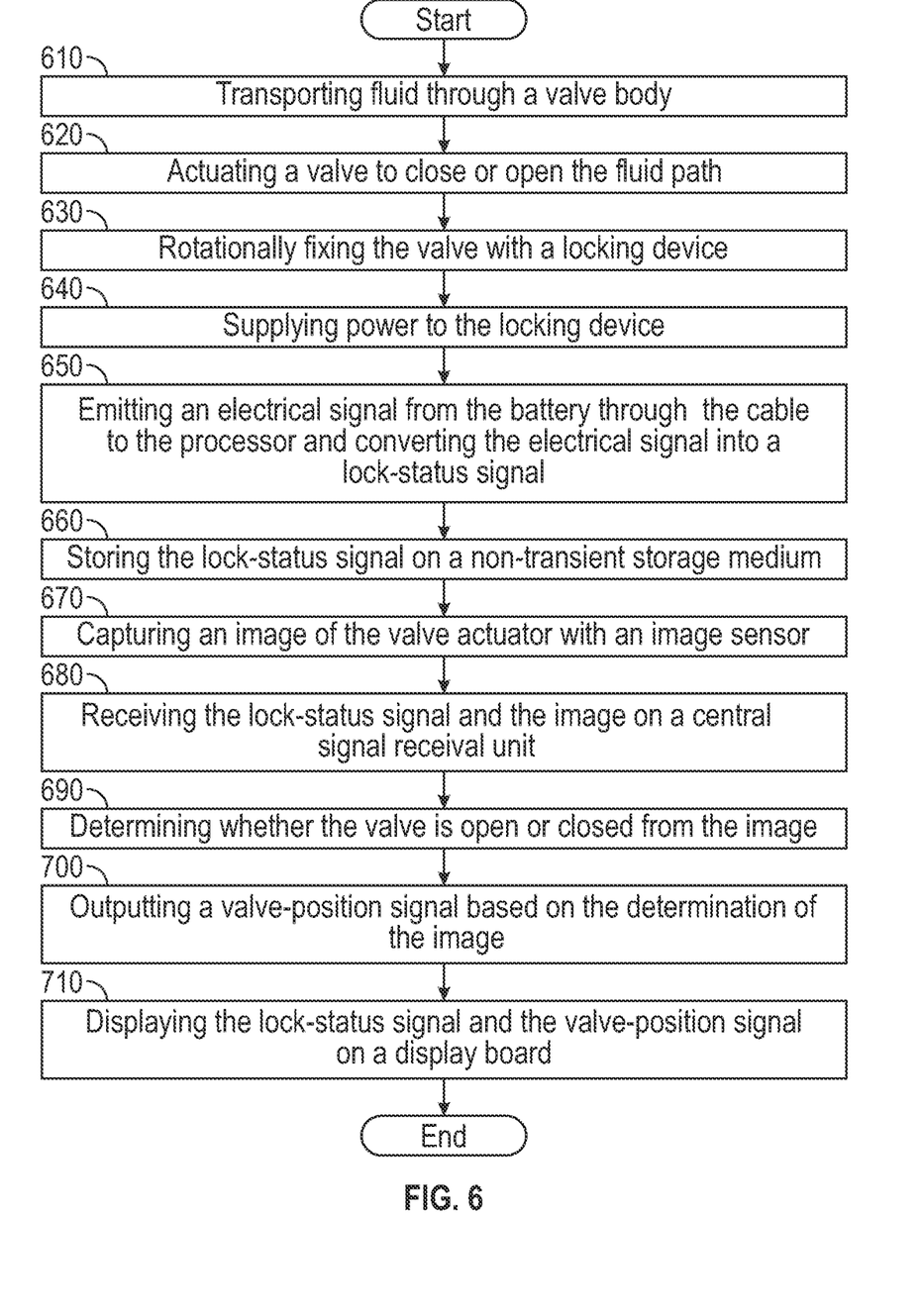
FIG. 6 depicts a flowchart of a method in accordance with one or more embodiments of the invention.

FIG. 6 depicts a method for acquiring the lock-status signal 51 and the valve-position signal 53 for a monitored valve (not shown) in accordance with one or more embodiments of the invention. While the various blocks in FIG. 6 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially, in Step 610, a fluid is transported through a valve body 28. The valve body 28 comprises an inlet port and an outlet port allowing for the transportation of fluids, and a valve (not shown) is positioned in between the two ports to control fluid flow.

During Step 620, the valve actuator 43 is rotated by an operator to either the open position or the closed position. The open position of the valve (not shown) opens the fluid path and allows the fluid to flow freely. Conversely, the closed position of the valve (not shown) closes the fluid path and prevents the fluid from flowing.

In Step 630, the valve actuator 43 is rotationally fixed with the locking device 13. The cable 29 of the locking device 13 may be wrapped through the valve actuator 43 and around the valve body 28, and then inserted and pulled through the reception port 31 until the cable 29 is taught and the valve actuator 43 cannot move. At the operator's discretion, excess cable 29 pulled through the locking device 13 can be cut.

In Step 640, the battery supplies power to the locking device 13 and provides an electrical signal that runs through the cable 29 and is registered by the processor 35 in the locking device 13. The battery may be either rechargeable or disposable, at the manufacturer's discretion. The battery should only provide a minimal voltage to the cable 29 such that the electrical signal can be registered by the processor 35, but not cause harm through electrical shock to an operator. If the voltage running through the cable 29 is severe, insulation may be applied to the cable 29 preventing accidental electrocution.

In Step 650, the electrical signal is registered from the cable 29 by the processor 35 and the processor 35 converts the electrical signal into a lock-status signal 51. When the electrical signal from the cable 29 reaches the processor 35, the processor 35 determines that the locking device 13 is locked. When the processor 35 does not receive an electrical signal from the cable 29, the processor 35 determines the locking device 13 is unlocked. The locking device 13 would be determined as unlocked in the case when the cable 29 is cut between the battery and the reception port 31, thus preventing the electrical signal to reach the processor 35, and the locking device 13 would also be considered unlocked in the case that the cable 29 is not inserted into the reception port 31, thus preventing the electrical signal to reach the processor 35. On the occasion that the battery dies and no power is provided to the locking device 13, the processor 35 will not function and the first transceiver 39 will not transmit a lock-status signal 51 to the central signal receival unit 19, in which case the central signal receival unit 19 will alert the operator that the associated locking device 13 requires manual operator action.

In Step 660, after the processor 35 has determined the lock-status signal 51 of the locking device 13, the lock-status signal 51 is stored on the memory 37, which comprises a non-transient storage medium. The lock-status signal 51 as well as an associated timestamp is stored in the memory 37. If communication errors occur between the locking device 13 and the central signal receival unit 19, the memory 37 of the locking device 13 can be used to provide a record of the lock-status signal 51.

In Step 670, the image sensor 17 captures an image of the valve actuator 43 with the lens 15. The image may include one or more valve actuators 43, and the valve assemblies 27 may or may not have locking devices 13 on them. More than one image sensor 17 can be used in this step in order to capture all of the valve actuators 43 in the operating plant site 11.

In Step 680, the central signal receival unit 19 receives the lock-status signal 51 from the locking device 13 and the image from the image sensor 17. The central signal receival unit 19 may receive signals from a plurality of image sensors 17 and a plurality of intermediary signal receival units.

In Step 690, the image processing module 21 of the central signal receival unit 19 determines whether the valve (not shown) is in the open position or the closed position based on the valve actuator 43 in the image. The image processing module uses an AI model comprising a YOLO algorithm to locate the position of the valve actuator 43 in the image and the position of the valve axis 47 relative to the neutral axis 45. Alphanumeric markers 44 present on the valve actuator 43 may allow the YOLO algorithm to more efficiently identify the difference between the valve axis 47 and the neutral axis 45.

In Step 700, the image processing module 21 outputs a valve-position signal 53 based on the determination of the image. The valve-position signal 53 will either be "open" or "closed." which is associated with the open position and the closed position, respectively.

In Step 710, the lock-status signal 51 and the valve-position signal 53 are displayed on the display board. The display board 49 is a user interface which allows an operator to remotely monitor the valve assemblies 27 in an operating plant site 11. The display board provides the lock-status signal 51 and the valve-position signal 53 of every valve (not shown) in the operating plant site 11.

Accordingly, the aforementioned embodiments of the invention as disclosed relate to systems and methods useful in reducing manpower and human error in monitoring the position of valves (not shown). In addition, embodiments of the invention provide further compliance with safety measures by immediately alerting an operator when a locking device 13 becomes unlocked rather than waiting for an operator to intermittently check the locking device 13 manually in person.

Although only a few example embodiments have been described in detail above, those skilled in the art will readily appreciate that many modifications are possible in the example embodiments without materially departing from this invention, for example, either a car seal or a lockout/tagout design may be used for the locking device 13. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A system for monitoring a valve position comprising:
a valve assembly comprising:
a valve body having an inlet port and an outlet port, with a fluid path extending between the inlet port and the outlet port that is configured to transport one or more fluids through the valve body;
a valve situated in the fluid path between the inlet port and the outlet port configured to actuate from a closed position, which closes the fluid path between the inlet port and the outlet port, to an open position in which fluid flows freely through the valve body, and
a valve actuator, secured relative to the valve body, for moving the valve relative to an axis, between a closed position, which closes the fluid path between the inlet port and the outlet port, and an open position;
a locking device disposed through the valve actuator and around the valve body such that the valve is prevented from turning without operator interference, the locking device comprising:
a cable configured to transmit an electrical signal to a processor when the locking device is locked;
wherein the processor is further configured to convert the electrical signal into a lock-status signal indicating the locking device is locked;
wherein when the processor does not receive the electrical signal transmitted by the cable, the processor is further configured to output the lock-status signal indicating the locking device is unlocked;
a data storage unit configured to store the lock-status signal determined by the processor on a non-transient storage medium;
a first transceiver configured to transmit the lock-status signal;
a battery configured to supply power to the cable, the processor, the data storage unit, and the first transceiver, and
a bus configured to transmit data and power through the processor, the data storage unit, the first transceiver, and the battery;
an image sensor configured to capture an image including a field of view including the valve actuator and the locking device disposed on the valve assembly, the image sensor comprising:
a lens configured to capture the image, and
a second transceiver configured to transmit the image;
a central signal receival unit configured to receive the lock-status signal from the locking device, recognize a position of the valve actuator from the image, and convert the position of the valve actuator into a valve-position signal, the central signal receival unit comprising:
an image processing module configured to recognize the valve actuator in the image, and
a communication port configured to transmit the lock-status signal and the valve-position signal, and
a display board configured to receive the lock-status signal and the valve-position signal from the central signal receival unit and display the lock-status signal and the valve-position signal for an operator to view, wherein the image sensor is connected to the central signal receival unit with a data connection.

2. The system of claim 1, wherein the central signal receival unit is connected to a plurality of image sensors.

3. The system of claim 1, wherein the locking device is configured to be presented in a plurality of color options corresponding to a particular type of fluid being transmitted through the fluid path.

4. The system of claim 1, wherein the locking device further comprises a reception port where the cable is inserted.

5. The system of claim 1, wherein if the first transceiver of the locking device does not transmit the lock-status signal, then the central signal receival unit indicates that manual operator action is required.

6. The system of claim 4, wherein the cable is formed of galvanized steel.

7. The system of claim 1, wherein the locking device is an IoT device that transmits signals through the first transceiver in a form of radio waves with a frequency between 10 Kilohertz (kHz) and 100 Gigahertz (GHz) to the central signal receival unit.

8. The system of claim 1, wherein the valve actuator contains distinct alphanumeric markers that the image processing module can identify.

9. The system of claim 1, wherein the central signal receival unit is configured to recognize the valve actuator in the image by providing the image to an AI model comprising a You Only Look Once (YOLO) algorithm.

10. The system of claim 1, wherein the central signal receival unit is connected to a plurality of other signal receival units that each transmit the lock-status signal and one or more images to the central signal receival unit.

11. A method to monitor a valve position, the method comprising:
transporting one or more fluids through a fluid path of a valve body;
actuating a valve situated in the fluid path from a closed position, which closes the fluid path, to an open position in which fluid flows freely through the valve body, as well as one or more intermediary positions between the closed position and the open position;
rotationally fixing a location of the valve relative to the valve body with a cable of a locking device, such that the valve is prevented from turning without operator interference;
supplying power to the locking device;
emitting an electrical signal from a battery through a cable to a processor;
converting the electrical signal into a lock-status signal with the processor of the locking device, the lock-status signal indicating whether the locking device is locked or unlocked;
storing the lock-status signal on a non-transient storage medium of the locking device that receives the lock-status signal from the processor with a bus;
capturing an image with an image sensor including a field of view of a valve actuator that actuates the valve and the locking device,
receiving, with a central signal receival unit connected to the image sensor with a data connection, the lock-status signal from the locking device and the image from the image sensor;
determining whether the valve actuator is in the closed position or the open position from the image;
outputting a determination of whether the valve actuator is in the closed position or the open position as a valve-position signal to a display board, and displaying the lock-status signal and the valve-position signal with the display board and display the lock-status signal and the valve-position signal for an operator to view.

12. The method of claim 11, further comprising: connecting a plurality of image sensors to the central signal receival unit.

13. The method of claim 11, further comprising: providing the locking device in a plurality of color options, where each color option of the plurality of color options corresponds to a particular type of fluid that is transmitted through the fluid path.

14. The method of claim 11, further comprising inserting the cable into a reception port.

15. The method of claim 11, further comprising: the central signal receival unit indicating that manual operator action is required if a first transceiver of the locking device does not transmit the lock-status signal.

16. The method of claim 14, wherein the cable is formed of galvanized steel.

17. The method of claim 11, further comprising: transmitting the lock-status signal to the central signal receival unit in a form of radio waves with a frequency between 10 Kilohertz (kHz) and 100 Gigahertz (GHz).

18. The method of claim 11, further comprising: determining an intermediary position of the valve actuator by identifying an alphanumeric marker disposed on the valve actuator.

19. The method of claim 11, further comprising: the central signal receival unit configured to recognize the valve actuator in the image by using an AI model comprising a You Only Look Once (YOLO) algorithm.

20. The method of claim 11, further comprising: connecting a plurality of signal receival units to the central signal receival unit.

* * * * *